United States Patent
Moosavi et al.

(10) Patent No.: US 9,232,329 B2
(45) Date of Patent: *Jan. 5, 2016

(54) PUBLIC ADDRESS SYSTEM USING WIRELESS MOBILE COMMUNICATION DEVICES

(71) Applicant: BLACKBERRY LIMITED, Waterloo (CA)

(72) Inventors: Vahid Moosavi, Waterloo (CA); Sean Wilson, Waterloo (CA); Scott Douglas Rose, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 239 days.

This patent is subject to a terminal disclaimer.

(21) Appl. No.: 13/966,377

(22) Filed: Aug. 14, 2013

(65) Prior Publication Data

US 2014/0023204 A1    Jan. 23, 2014

Related U.S. Application Data

(63) Continuation of application No. 12/393,870, filed on Feb. 26, 2009, now Pat. No. 8,538,383.

(51) Int. Cl.
| | | |
|---|---|---|
| H04M 1/725 | (2006.01) | |
| H04L 12/58 | (2006.01) | |
| H04R 27/00 | (2006.01) | |
| H04W 24/02 | (2009.01) | |

(52) U.S. Cl.
CPC ............... *H04R 27/00* (2013.01); *H04W 24/02* (2013.01); *H04R 2410/00* (2013.01); *H04R 2420/07* (2013.01)

(58) Field of Classification Search
CPC ............... H04R 27/00; H04R 2410/00; H04R 2420/07; H04W 24/02; H04W 4/02; H04W 4/12; H04L 12/1859; H04L 51/38; H04L 12/5895; H04L 12/189; H04L 12/1895
See application file for complete search history.

(56) References Cited

U.S. PATENT DOCUMENTS

| | | | |
|---|---|---|---|
| 8,224,305 B2 * | 7/2012 | Gupta | 455/416 |
| 2006/0205426 A1 * | 9/2006 | Denton | 455/518 |
| 2007/0065794 A1 * | 3/2007 | Mangum | 434/307 A |
| 2008/0108328 A1 * | 5/2008 | Lovell | 455/412.1 |

OTHER PUBLICATIONS

Vahid et al., U.S. Appl. No. 12/393,870 filed Feb. 26, 2009—Public Address System Using Wireless Mobile Communication Devices.

* cited by examiner

*Primary Examiner* — Vibol Tan
(74) *Attorney, Agent, or Firm* — Perry + Currier, Inc.

(57) ABSTRACT

A public address system is set forth, comprising at least one wireless mobile communication device; a sound system; and a back-end system for selectively receiving a wireless signal from the wireless mobile communication device and transmitting the signal to the sound system for broadcast.

18 Claims, 5 Drawing Sheets

BACK-END SYSTEM

TO FIG. 3

RFID TAG

TO FIG. 3

PUBLIC ADDRESS SYSTEM USING WIRELESS MOBILE COMMUNICATION DEVICES

TECHNICAL FIELD

The present disclosure relates generally to public address systems, and more particularly to a public address system using wireless mobile communication devices as microphones.

BACKGROUND

When an audience member wishes to speak (e.g. in order to ask a question of a presenter in a large conference room/auditorium), the audience member usually raises his/her hand in an effort to attract the attention of a moderator/master of ceremonies. Upon being recognized by the moderator/master of ceremonies, the audience member then normally has to wait for a wireless microphone to be passed to him/her by a conference assistant who must deliver the wireless microphone, either directly or hand-to-hand by several other audience members, and thereafter retrieve it in like fashion. This process is inefficient in that the moderator/master of ceremonies may accidentally overlook the audience member, and time delays are introduced while the audience member waits to receive the cordless microphone.

DETAILED DESCRIPTION

According to an aspect of this specification, there is provided a public address system, comprising at least one wireless mobile communication device; a sound system, and a back-end system having an interface for exchanging connection information and requests with the at least one wireless mobile communication device and in response sending a connection authorization message to the at least one wireless mobile communication device for enabling access to the sound system and transmission of wireless audio signals thereto for broadcast.

According to another aspect, there is provided a wireless mobile communication device, comprising: a microphone, a wireless microphone application for converting audio signals to wireless signals, and at least one communications subsystem or sending a request message responsive to one of either activation of a URL link or launching of the wireless microphone application, receiving a connection authorization message, and in response transmitting the wireless signals for broadcast.

According to a further aspect of this specification, there is provided a back-end system for use in a public address system, comprising: an antenna, a computer that includes a data interface and application software for exchanging connection information and requests with a plurality of mobile communication devices via the antenna and in response arbitrating between the requests and sending a connection authorization message to one of the wireless mobile communication devices to enable access to the public address system and receiving and converting wireless signals from the one wireless mobile communication device to audio signals, and an audio interface for transmitting the audio signals to at least one speaker.

According to yet another aspect of this specification, there is provided a method of operating a public address system, comprising receiving at least one request message for access to the public address system, processing the request message for arbitrating between the request message and any other pending request message to access the public address system, and in response sending a connection authorization message to enable access to the public address system, and receiving wireless audio signals and transmitting said audio signals to the public address system.

Figure 1:
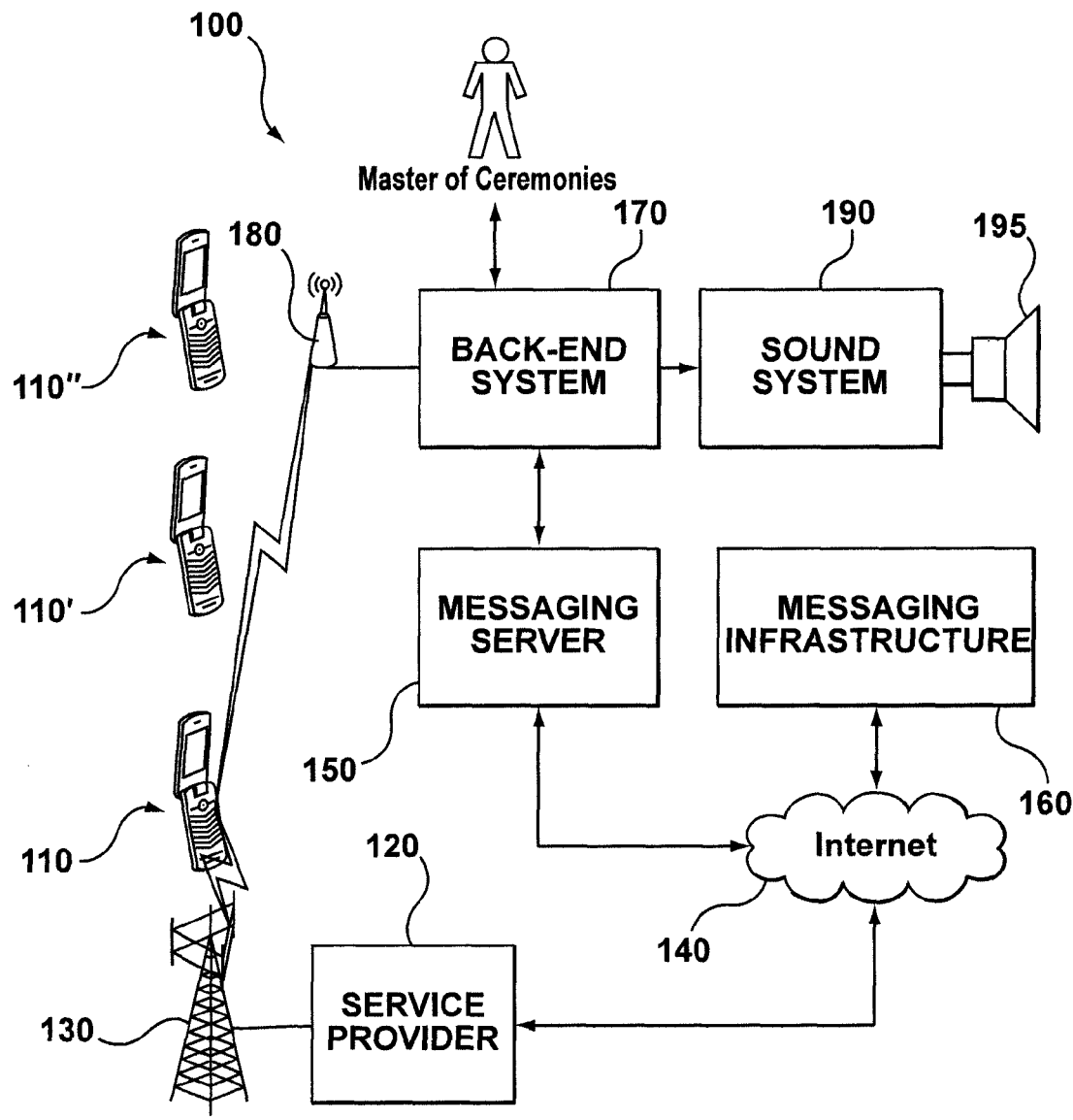
FIG. 1 is a block diagram of an illustrative public address system using wireless mobile communication devices as microphones, in accordance with the present disclosure.

FIG. 1 shows an illustrative public address system 100 using wireless mobile communication devices 110, 110', 110", etc., as microphones. The public address system 100 may be configured to, operate in a large conference room or auditorium environment, or other public or private venue.

Wireless mobile communication devices 110, 110', 110" communicate with a service provider 120 via a cellular network 130 to exchange voice and data. The service provider 120 communicates via the Internet 140 to exchange voice and data with at least one messaging server 150 under control of a messaging infrastructure 160, in a well known manner.

The public address system 100 includes a back-end system 170 which, in the illustrated embodiment, includes an interface for communicating with the messaging server 150, as described in greater detail below, and an interface connected to an antenna 180 for wireless communication with mobile communication devices 110, 110', 110" using any of a plurality of well known wireless protocols, such as Wi-Fi or Bluetooth™ (Bluetooth™ is a registered trademark of Bluetooth SIG, Inc.), etc. Wirelessly transmitted voice signals are transmitted from back-end system 170 to a sound system 190 for amplification and broadcast over at least one loudspeaker 195.

Back-end system 170 preferably comprises a computer, such as a PC or server that includes application software for wireless communication with mobile communication devices 110, 110', 110", using Bluetooth™, Wi-Fi, or other suitable wireless protocol. The system 170 preferably also includes an audio interface having an analog audio output to the sound system 190.

Figure 2:
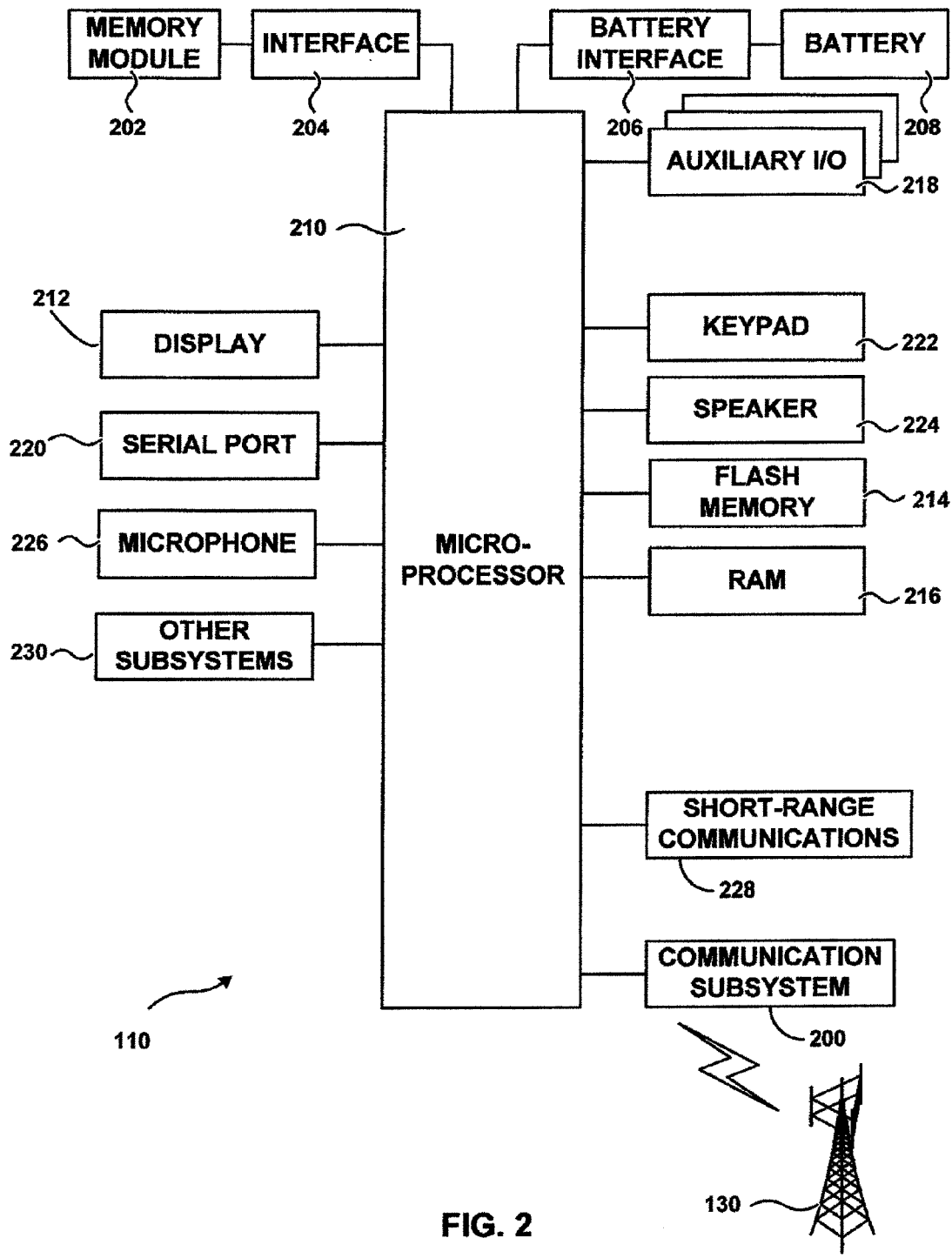
FIG. 2 is block diagram illustrating a wireless mobile communication device in accordance with the present disclosure.

FIG. 2 shows a block diagram illustrating some of the components of the wireless mobile communication devices 110, 110', 110", etc. In the embodiment depicted in FIG. 2, wireless mobile communication device 110 includes a communication subsystem 200 for wireless two-way data and, voice communication with the cellular network 130. Communication subsystem 200 may include one or more receivers, transmitters, antennas, signal processors and other components associated with wireless communications. The particular design of the communication subsystem 200 depends on the network in which the wireless mobile communication device 110 is intended to operate. The concepts herein may be applicable to a variety of wireless mobile communication devices, such as two-way pagers, cellular telephones, etc.

In the embodiment shown in FIG. 2, network access is associated with a subscriber or user of the wireless mobile communication device 110 via a memory module 202, which may be a Subscriber Identity Module (SIM) card for use in a GSM network or a Universal Subscriber Identity Module (USIM) card for use in a Universal Mobile Telecommunication System (UMTS). The SIM card is inserted in or connected to an interface 204 of the wireless mobile communication device 110 to operate in conjunction with a wireless network. Alternatively, the wireless mobile communication device 110 may have an integrated identity module for use with systems such as Code Division Multiple Access (CDMA) systems.

The wireless mobile communication device 110 also includes a battery interface 206 for receiving at least one rechargeable battery 208. The battery 208 provides electrical power to at least some of the electrical circuitry in the wireless mobile communication device 110, and the battery interface 206 provides a mechanical and electrical connection for the battery 208.

The wireless mobile communication device 110 includes a microprocessor 210 which controls the overall operation of the wireless mobile communication device 110. Communication functions, including at least data and voice communications, are performed through the communication subsystem 200, as discussed above. The microprocessor 210 also interacts with additional device subsystems such as a display 212, flash memory 214, a random access memory (RAM) 216, auxiliary input/output (I/O) subsystems 218, a data port such as serial port 220, keypad 222, speaker 224, microphone 226, a short-range (i.e. near field) communications subsystem 228, and any other device subsystems generally designated as 230. The microprocessor may further interact with other components, which for simplicity are not shown in FIG. 2.

The microprocessor 210, in addition to its operating system functions, enables execution of software applications on the wireless mobile communication device 110. Software, which may include operating system software or application software, may be stored in flash memory 214, RAM 216 or any other memory element. As will be discussed below, according to an exemplary embodiment, application software is provided to permit the wireless mobile communication device 110 to function as a wireless microphone in the public address system 100 of FIG. 1.

A predetermined set of applications that control basic device operations, including data and voice communication applications, will normally be installed on the wireless mobile communication device 110 during or after manufacture. The wireless mobile communication device 110 may include a personal information manager (PIM) application having the ability to organize and manage data items relating to a user such as, but not limited to, instant messaging, email, calendar events, voice mails, appointments, and task items.

In a data communication mode, a received data signal representing information such as a text message, an email message, a media file to be transferred, or Web page download will be processed by the communication subsystem 200 and input to the microprocessor 210, which will further process the signal. In response to the received data signal, the microprocessor 210 may generate output for display on the display 212.

For voice communications, the wireless mobile communication device 110 may receive one or more signals associated with a voice communication, such as an indication of the identity of a calling party. In response to the received data signal, the microprocessor 210 may generate output for display on display 212 and/or the speaker 224.

In addition, as discussed briefly above, a short-range communications subsystem 228 is provided for communication between the wireless mobile communication device 110 and different systems or devices, which need not necessarily be similar devices. For example, the short-range communications subsystem 228 may include an infrared device and associated circuits and components, or a wireless bus protocol compliant communication mechanism such as a Bluetooth™ communication module to provide for communication with similarly-enabled systems and devices. In another embodiment, the short-range communications subsystem 228 may be a wireless networking communications subsystem, conforming to IEEE 802.11 standards such as one or more of 802.11b, 802.11g, or 802.11n.

In an embodiment discussed in greater detail below, the short-range communications subsystem 228 permits wireless communication with the public address system 100 via antenna 180 using any of the foregoing well known wireless protocols to transmit voice signals that are then sent to sound system 190 for broadcast over the loudspeaker 195. The choice of wireless protocol may depend on the size of auditorium/hall/conference room in which the meeting is to take place. For example, a person of skill in the art will appreciate that phone-class Bluetooth™ communications may be used for distances of about 10 meters between the wireless mobile communication devices 110, 110', 110" and the public address system 100, whereas WiFi provides a range of about 100 meters.

In another embodiment discussed below in connection with FIG. 4 the short-range communications subsystem 228 may also communicate with an RFID/NFC (radio frequency identification/near field communication) or similar tag to identify an audience member and associate the audience member with a particular seat (or other location) in order to permit the audience member to speak or initiate questions under control of back-end system 170.

The wireless mobile communication devices 110, 110', 110" may include one or more circuit boards (not shown) that implement the components described above. This disclosure is not limited to any particular electronic component or sot are module or any combination thereof.

In operation, according to the embodiment of FIGS. 1, 2 and 3 and 3A, a master of ceremonies (MC) issues an SMS/email/calendar appointment invitation (step 300) to the wireless mobile communication devices 110, 110', 110", etc. of a plurality of invited participants. Preferably, the invitation includes a link (e.g. URL) to a web site that provides information on how to connect to the public address system at the designated time and place of the appointment (i.e. meeting).

When an invited participant wishes to ask a question, make a comment or otherwise speak, he/she either clicks on the link in the invitation displayed on his/her wireless mobile communication device 110, 110', 110", etc. or launches an application on the wireless mobile communication device (step 305), which causes the device 110, 110', 110" to send a request message to back-end system 170 via the cellular network 130, Internet 140 and messaging server 150 under control of messaging infrastructure 160 (step 310). The request message is processed by the back-end system 170 (step 315), either automatically or under control of the MC, to arbitrate between the user request and any other pending user requests to access the public address system 100 via their wireless mobile communication devices 110, 110', 110", etc. In one embodiment, the back-end system 170 may send a confirmation message to the wireless mobile communication device 110, 110', 110", for displaying a message via display 212 to indicate that the user's request is pending.

Once the moderator/master of ceremonies (or automatic arbitration/selection program) determines that the request to speak should be granted, back-end system 170 transmits a connection authorization message (step 320) to the user's wireless mobile communication device 110, 110', 110" via messaging server 150 under control of messaging infrastructure 160, Internet 140 and the cellular network 130, to enable access to the public address system 100 via antenna 180. In response to receiving the authorization message (step 325), the wireless mobile communication device 110, 110', 110" launches its wireless microphone application from flash memory 214, RAM 216, etc., and communicates with the public address system 100 via antenna 180 (step 330) to transmit voice signals that are then sent to sound system 190 for broadcast over the loudspeaker 195. The wireless microphone application functions in a manner similar to well known hands-free applications for mobile GPS units, and can either be pre-loaded on the wireless mobile communication device 110, 110', 110", manually downloaded from service provider 120 (or other web application provider), or automatically downloaded from the back-end system 170 along with the connection data during step 320 or, according to one embodiment discussed below in connection with FIG. 4, the wireless microphone application may be downloaded from an RFID/NFC device to the wireless mobile communication device 110, 110', 110". In one embodiment, the wireless microphone application may enforce frequency damping to avoid feedback from loudspeaker 195.

Security of the voice channel between wireless mobile communication devices 110, 110', 110" and the public address system 100 may be provided using conventional protocols. For example, Wi-Fi utilizes WPA (Wi-Fi Protected Access) while Bluetooth™ may include a security layer on top of the communications channel, as is well known in the art.

Figure 3:
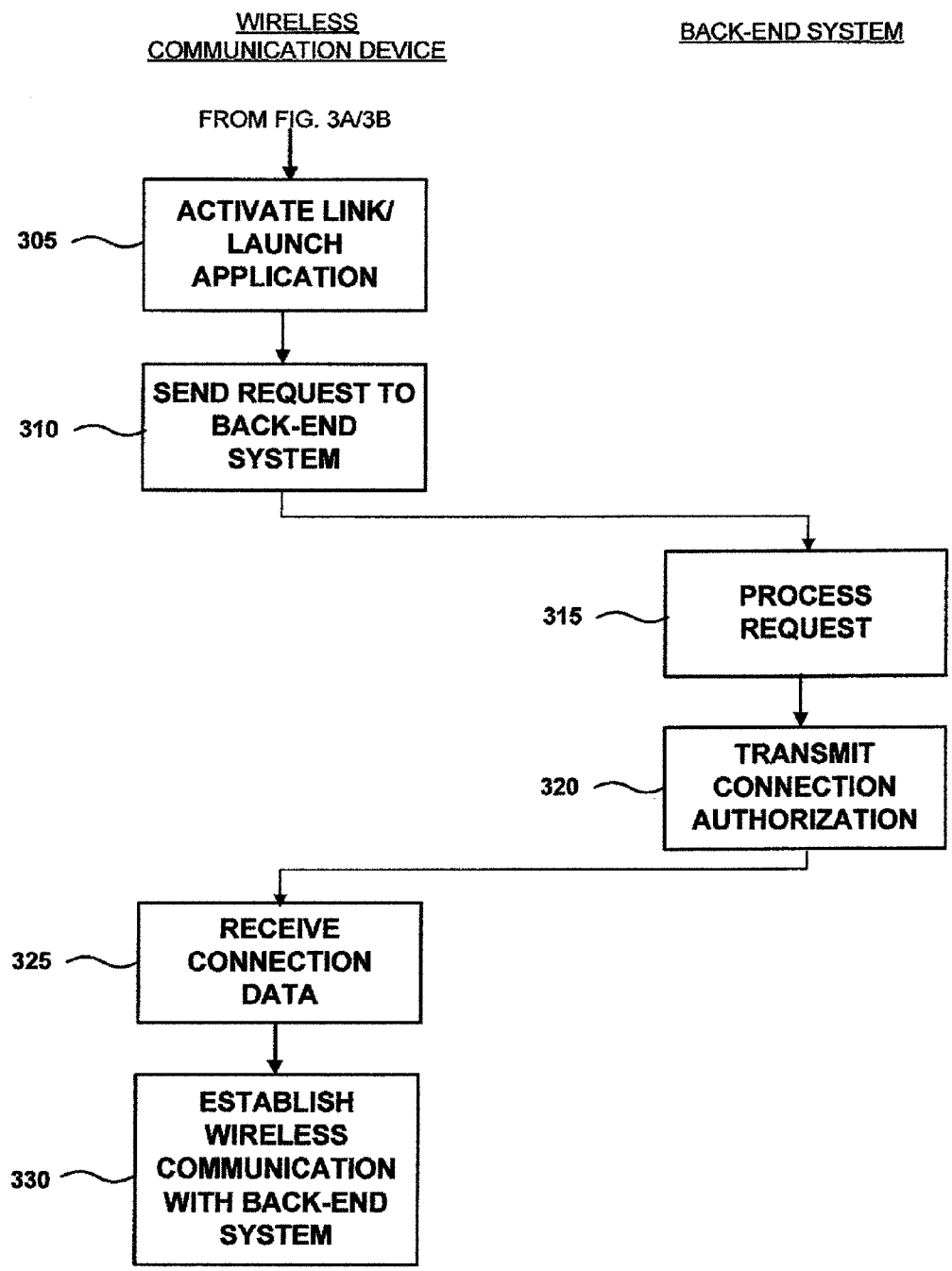
FIGS. 3, 3A and 3B, are flow diagrams illustrating a method carried out by a wireless mobile communication device and a back-end system of the public address system, in accordance with the present disclosure.
Figure 3A:
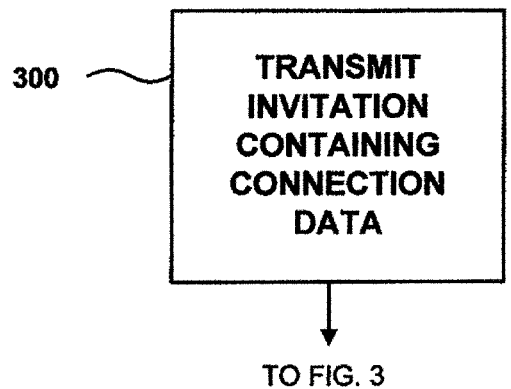
Figure 3B:
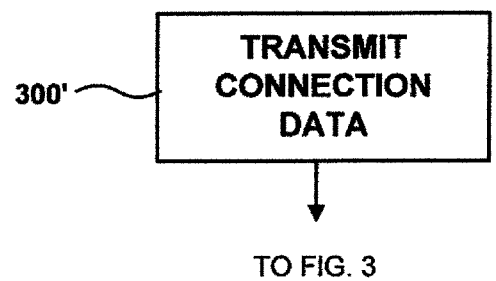
Figure 4:
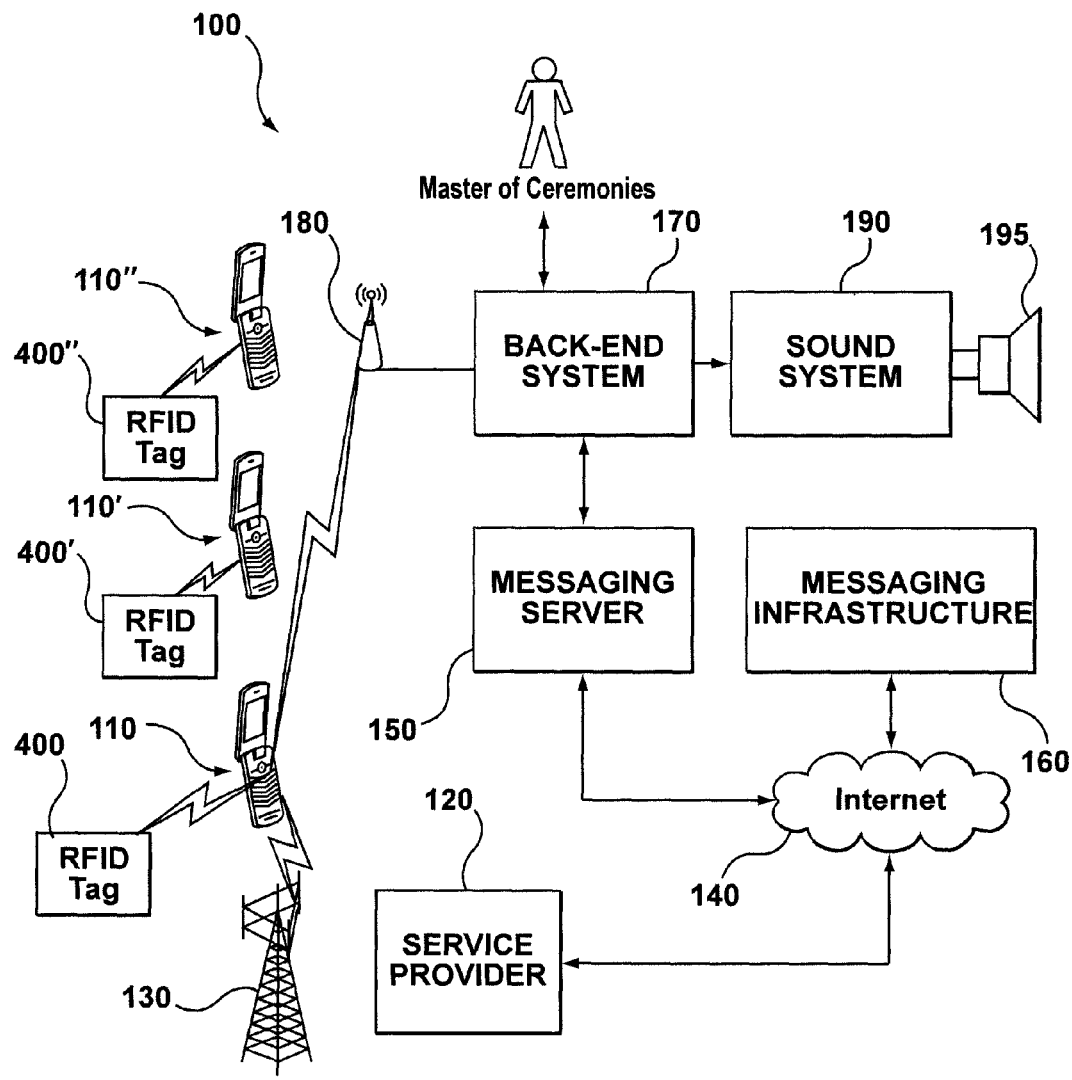
FIG. 4 is a block diagram of an alternative public address system using wireless mobile communication devices as microphones, in accordance with the present disclosure.

Turning to the alternative embodiment of FIG. 4, whose operation is set forth in FIGS. 3 and 3B, before the meeting is scheduled to take place, an NFC-enabled device is used to program individual RFID/NFC tags 400, 400', 400", etc. with password information to enable either Bluetooth™ pairing or Wi-Fi authentication to the public address system 100.

During the meeting, when a participant wishes to ask a question, make a comment or otherwise speak, he/she either 'taps' (i.e. touches) his/her wireless mobile communication device 110, 110', 110", etc. on the RFID/NFC tag 400, 400', 400", etc. which causes the tag to transmit connection information (step 300') for connecting to the public address system 100 (i.e. type, encryption keys, PIN, seat number, etc.). As discussed above, in one embodiment, the wireless microphone application is also downloaded from the RFID/NFC tags 400, 400', 400", etc. to wireless mobile communication devices 110, 110', 110", etc.

RFID/NFC tags 400, 400', 400", etc. are integrated electronic chips and antennae. Normally, the RFID/NFC tags are passive and battery-less and are powered by an electromagnetic excitation field from the short range (near field) communications component 228 of the mobile communication device. However, active, battery-powered tags may also be utilized.

In response to downloading the connection information, the wireless mobile communication device 110, 110', 110", etc. launches an application (step 305), which causes the device 110, 110', 110" to wirelessly send a request message to back-end system 170 via one of either antenna 180 or the cellular network 130, Internet 140 and messaging server 150 under control of messaging infrastructure 160 (step 310). The request message is processed by the back-end system 170 (step 315), either automatically or under control of the MC, to arbitrate between the user request and any other pending user requests to access the public address system 100 via their wireless mobile communication devices 110, 110', 110", etc.

Once the moderator/master of ceremonies (or automatic arbitration/selection program) determines that the request to speak should be granted, back-end system 170 sends a connection authorization message (step 320) to the user's wireless mobile communication device 110, 110', 110" to enable access to the public address system 100 via antenna 180. In response to receiving the authorization message 320 (step 325), the wireless mobile communication device 110, 110', 110" launches its wireless microphone application from flash memory 214, RAM 216, etc., and communicates with the public address system 100 via antenna 180 (step 330) to transmit voice signals that are then sent to sound system 190 for broadcast over the loudspeaker 195, as discussed above in connection with the embodiment of FIG. 1.

From the foregoing, it will be appreciated that a difference between the embodiments of FIGS. 1 and 4 is that in the embodiment of FIG. 4 connection/authentication information is received from the RFID/NFC tags 400, 400', 400", etc. (step 300') instead of being downloaded following user selection of a link in an email/SMS invitation and sending of the invitation before the meeting (step 300), as in the embodiment of FIG. 1.

The embodiments set forth above are for illustration, and although one or more particular embodiments of the system and method have been described herein, changes and modifications may be made thereto. For example, although transmission of the connection authorization message (step 320) from back-end system 170 to the user's wireless mobile communication device 110, 110', 110" is described in the embodiments of FIGS. 1 and 4 as occurring via messaging server 150 under control of messaging infrastructure 160, Internet 140 and the cellular network 130, it is contemplated that the connection authorization message can be transmitted from back-end system 170 to the user's wireless mobile communication device 110, 110', 110" via antenna 180. All such changes are believed to be within the scope of this disclosure in its broadest aspects and as set forth in the following claims.

The invention claimed is:

1. A mobile phone comprising:
   a short range communication subsystem;
   one or more communication subsystems; and,
   a processor configured to:
      send, using the one or more communication subsystems, a request, and responsively receive connection data for accessing a sound system using the short range communication subsystem, the connection data configured to trigger the processor to launch a wireless microphone application for using the short range communication subsystem to transmit wireless signals to the sound system; and,
      in response to receipt of the connection data, launch the wireless microphone application.

2. The mobile phone of claim 1, wherein the one or more communication subsystems comprise a long range communications subsystem, and sending the request occurs using the long range communication subsystem.

3. The mobile phone of claim 2, wherein the long range communications subsystem comprises a cellular network communications subsystem.

4. The mobile phone of claim 1, wherein the short range communication subsystem comprises at least one of a Bluetooth transmitter and a WiFi transmitter.

5. The mobile phone according to claim 1, wherein the wireless microphone application enforces frequency damping to avoid feedback.

6. The mobile phone according to claim 1, wherein the processor is further configured to provide a confirmation indicating that the request is pending.

7. The mobile phone according to claim 1, wherein the wireless microphone application comprises one or more of: a pre-loaded application; a downloaded application from one or more of a wireless service provider and a web application provider; an automatically downloaded application that includes the connection data; and, an application downloaded from a radio frequency identification/near field communication tag.

8. A method comprising:
at a mobile phone comprising: a short range communication subsystem; one or more communication subsystems; and, a processor,
sending, using the one or more communication subsystems, a request and responsively receiving connection data for accessing a sound system using the short range communication subsystem, the connection data configured to trigger the processor to launch a wireless microphone application for using the short range communication subsystem to transmit wireless signals to the sound system; and,
in response to receiving the connection data, launching the wireless microphone application.

9. A mobile phone comprising:
a short range communication subsystem; one or more communication subsystems; and, a processor configured to:
receive, using the short range communication subsystem, connection data comprising password data for accessing a sound system;
in response to receipt of the connection data, send, using the one or more communication subsystems, a request and responsively receive a connection authorization message using the one or more wireless communication subsystems or the short range communication subsystem; and,
in response to receipt of the connection authorization message, launch a wireless microphone application for using the short range communication subsystem to transmit wireless signals to the sound system.

10. The mobile phone of claim 9, wherein the one or more communication subsystems comprise a long range communications subsystem, and sending the request and receiving the connection authorization message occurs using the long range communications subsystem.

11. The mobile phone of claim 10, wherein the long range communications subsystem comprises a cellular network communications subsystem.

12. The mobile phone of claim 9, wherein the short range communication subsystem comprises at least one of a Bluetooth transmitter and a WiFi transmitter.

13. The mobile phone according to claim 9, wherein the wireless microphone application enforces frequency damping to avoid feedback.

14. The mobile phone according to claim 9, wherein the processor is further configured to provide a confirmation indicating that the request is pending.

15. The mobile phone according to claim 9, wherein the wireless microphone application comprises one or more of: a pre-loaded application; a downloaded application from one or more of a wireless service provider and a web application provider; an automatically downloaded application that includes the connection data; and, an application downloaded from a radio frequency identification/near field communication tag.

16. A method comprising:
at mobile phone comprising: a short range communication subsystem; one or more communication subsystems; and, a processor,
receiving, using the short range communication subsystem, connection data comprising password data for accessing a sound system;
in response to receipt of the connection data, sending, using the one or more communication subsystems, a request and responsively receiving a connection authorization message using the one or more wireless communication subsystems or the short range communication system; and,
in response to receiving the connection authorization message, launching a wireless microphone application for using the short range communication subsystem to transmit wireless signals to the sound system.

17. A back-end system of a public address system, comprising:
an audio interface;
one or more antennas; and,
a computer configured to:
arbitrate between requests to access the public address system received from a plurality of mobile phones using the one or more antennas;
transmit, using the one or more antennas, connection data to a mobile phone of the plurality of mobile phones, the connection data configured to trigger the mobile phone to launch a wireless microphone application for using a short range communication subsystem to transmit wireless signals;
receive the wireless signals using the one or more antennas;
convert, using the audio interface, the wireless signal to audio signals; and,
transmit the audio signals to a sound system for amplification and broadcast over at least one speaker of the sound system.

18. The back-end system of claim 17, wherein the connection data comprises a password for accessing the sound system.

* * * * *